UNITED STATES PATENT OFFICE.

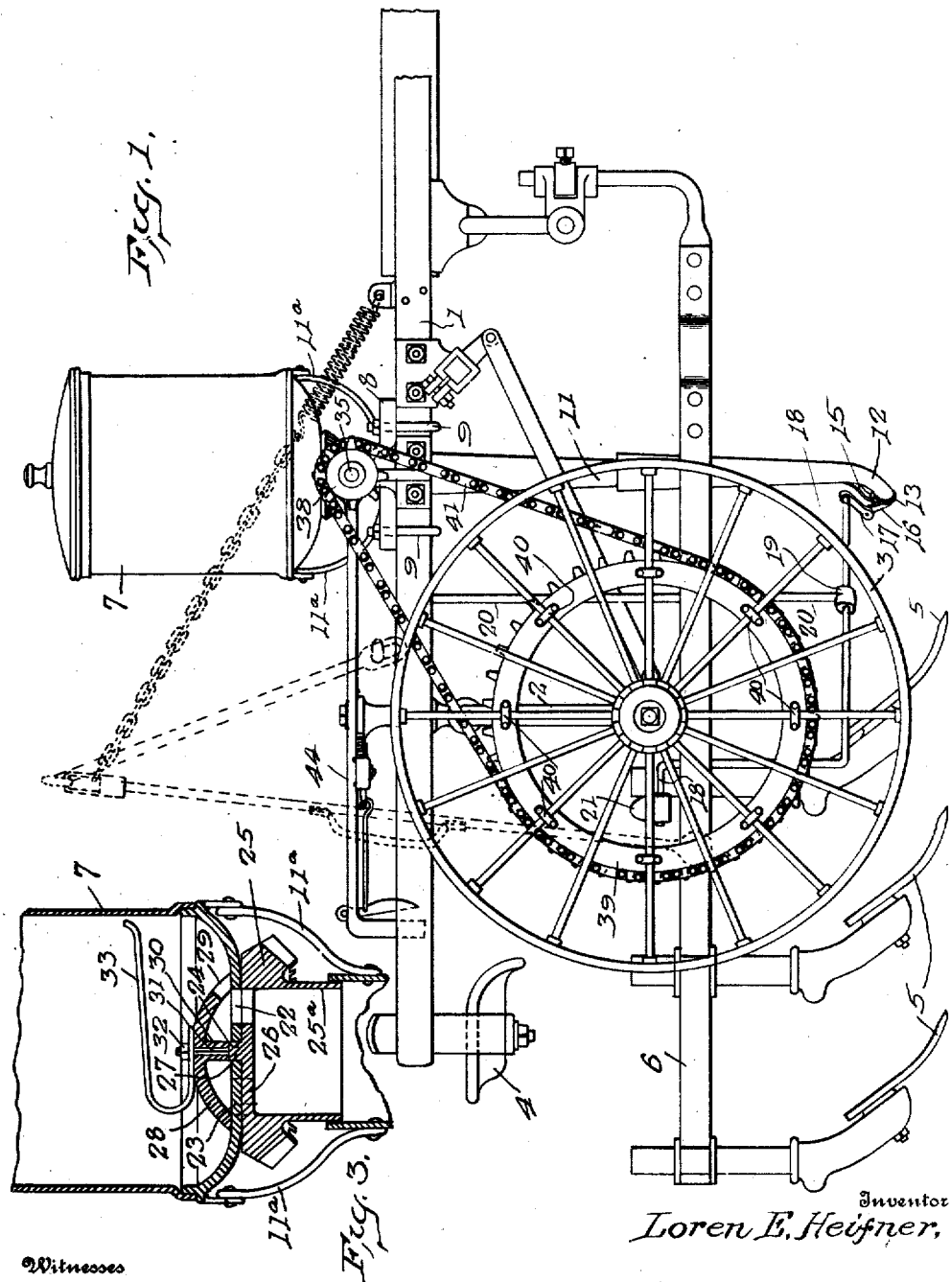

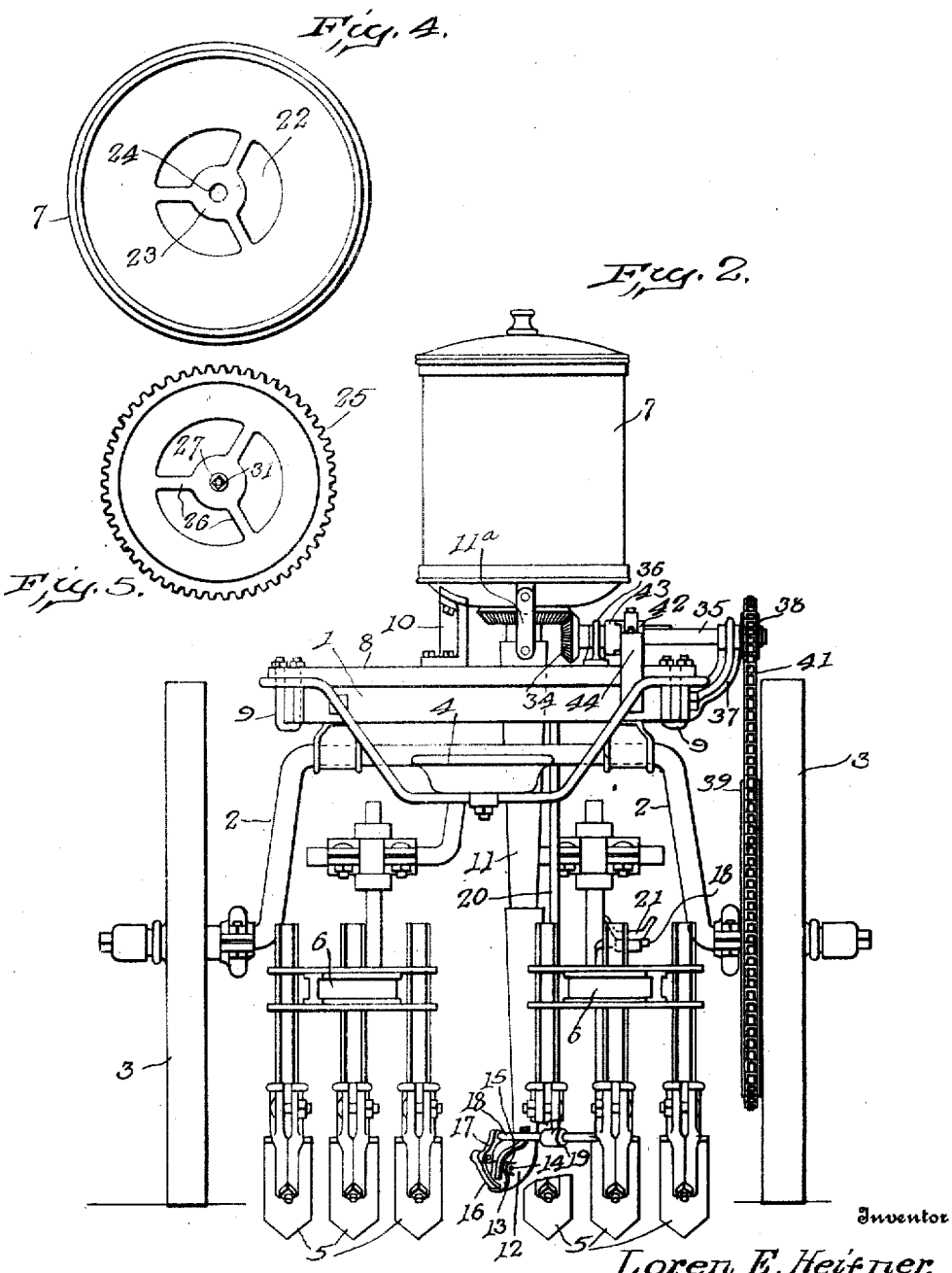

LOREN E. HEIFNER, OF NANKIN, OHIO.

FERTILIZER-DISTRIBUTER.

No. 928,971.  Specification of Letters Patent.  Patented July 27, 1909.

Application filed December 12, 1908. Serial No. 467,135.

*To all whom it may concern:*

Be it known that I, LOREN E. HEIFNER, a citizen of the United States, residing at Nankin, in the county of Ashland and State of Ohio, have invented certain new and useful Improvements in Fertilizer-Distributers, of which the following is a specification, reference being had therein to the accompanying drawings.
This invention relates to fertilizer distributers, and more particularly to such a distributer adapted to be attached to an agricultural implement.

The object of the invention is to provide a fertilizer distributer adapted to be attached to an agricultural implement; to provide such a distributer which will have its discharge mouth supported in a predetermined relation relatively to the working parts of said implement; to provide means actuated by the implement for feeding the fertilizer to the distributer; to so arrange the discharge mouth of the distributer that the material will be discharged close to the ground and close to the seed or plant which is to be fertilized without the liability of the entrance of dirt or the like into said mouth; to provide means for controlling the discharge of said fertilizer, whereby it may be discharged either continuously or at any desired point; to provide a distributer adapted to be secured to a cultivator and to fertilize growing crops; and further, to provide such a distributer which can be readily attached to agricultural implements of ordinary construction.

With these objects in view my invention consists in certain novel features and in certain combinations and arrangements of parts hereinafter to be described, and then more particularly pointed out in the claims.

In the accompanying drawings, Figure 1 is a side elevation of a cultivator embodying my invention; Fig. 2 is a rear elevation of the same; Fig. 3 is a vertical sectional view taken centrally of the hopper and showing the feeding mechanism, and Figs. 4 and 5 are detail views of the bottom of the hopper and the bevel gear, respectively.

In these drawings I have illustrated the preferred form of my invention and have shown the same in combination with a cultivator, but it will be understood that the cultivator is used for purposes of illustration only and that the distributer, as hereinafter described, may be readily adapted for use in connection with other agricultural implements, which implements may be adapted to plant the seed or to work the crop any time after the seed is planted.

The cultivator here shown is of ordinary construction and comprises a frame 1 supported on a U-shaped axle 2 having ground wheels 3 journaled on the outer ends thereof, the frame being preferably provided at a point near the rear end thereof with a seat 4 for the driver. Cultivating members 5 are supported from beams 6 in the ordinary manner. The beams themselves are supported from the main frame 1 in the ordinary manner which is such as to permit them to be moved toward or away from the row of plants under cultivation at the will of the operator.

In the present instance I have illustrated the fertilizer distributer as an attachment, adapted to be attached to or detached from the cultivator as desired, and, to this end, I have shown a hopper 7 adapted to contain the fertilizer and to be detachably supported on the main frame, preferably by securing the same to a base or supporting frame 8 which extends transversely to the main frame 1 and is detachably secured thereto by detachable clips, as shown at 9. The hopper may be supported on this base in any suitable manner, being, in the present instance, provided with one or more vertical standards or braces 10 extending between the same and the base and adapted to hold the same rigidly in position thereon. A spout 11 is supported beneath the hopper and is adapted to receive the fertilizer therefrom and to convey the same to the ground at the desired point. This spout is, in the present instance, shown as supported from the hopper 7 by links or arms 11ª and as comprising two sections telescopically connected one to the other to permit the same to be adjusted vertically. The lower portion 12 of the spout, in which the discharge mouth is formed, is preferably turned at such an angle to the vertical portion of the spout that it will extend in a substantially horizontal position and the spout is so adjusted that the discharge mouth will extend at a rearward angle to the line of movement of the cultivator, thus permitting the fertilizer to be discharged at a point close to, or even beneath, the surface of the ground without the liability of dirt or foreign matter entering the discharge portion of the spout. The hopper and spout 11 are arranged on the main frame of the cultivator in such relation to the cultivating members that the discharge mouth of the spout will occupy the desired position relatively to the row of plants under cultivation.

In order that the fertilizer may be distributed either continuously along the row of plants or at intervals, in order to place the same near the hills of corn only, I prefer to provide the discharge mouth of the spout with a movable closure, which closure is under the control of the operator. In the present instance, I have shown the horizontal portion 12 of the spout 11 as provided with a cap 13 which is pivotally mounted on the portion 12 of the spout at 14, and is held normally in a closed position by means of a curved spring 15 having one end secured to the spout 11 and its other end in engagement with the cap 13. A finger 16 extends outwardly from the cap 13 and is pivotally connected at its outer end to a link 17, which, in turn, is rigidly secured to a shaft or rod 18 which is journaled in a horizontal bearing 19 carried by the lower end of a rod 20 supported from the main frame. The rod 18 is bent upwardly at a point beyond the bearing 19 and is provided at its upper end with a foot piece 21 by means of which the rod 18 may be rotated in its bearing 19 to move the cap 13 into its open position against the tension of the spring 15. This foot piece is located within convenient reach of the operator from his seat 4, and, as the machine moves along the row of plants, the operator will actuate the rod 18 to open the discharge mouth of the spout at the desired intervals, or he may maintain the spout open at all times and thereby distribute the fertilizer continuously. While I have described foot-operated means for controlling this discharge mouth, it will be apparent that the discharge may be controlled in any suitable manner.

To prevent the fertilizer from packing in the hopper 7 and to cause the same to feed continuously to the spout 11 I prefer to provide a suitable positively driven feed mechanism. To this end I have provided the hopper 7 with a central opening 22 having arranged therein a spider 23, the central portion of which has a bearing aperture 24. A bevel gear 25 is supported immediately beneath the bottom of the hopper 7 and is preferably formed in the shape of a ring having gear teeth on the outer periphery thereof and provided with a spider 26 extending across the central opening therein. An upwardly extending bearing-stud 27 is rigidly secured to the central portion of the spider 26 and is adapted to enter the bearing aperture 24 in the spider 23 of the hopper bottom. An inverted cup-shaped member 28 having an opening 29 in one side thereof is rotatably mounted upon the bearing-stud 27 and has its circumferential edge in engagement with that portion of the bottom of the hopper 7 immediately surrounding the opening 22 therein. This inverted cup-shaped member may be supported on the bearing-stud 27 in any suitable manner. In the present instance I have shown the same as provided with a sleeve 30 and having an opening non-circular in cross section extending through both the sleeve and the adjacent portion of the cup-shaped member. A pin 31 rigidly secured to the bearing-stud 27 extends through the non-circular opening in the cup-shaped member and is provided at a point above the same with a nut 32, by means of which the cup-shaped member 28 is rigidly secured to the pinion 25 and rotates in unison therewith. An agitator arm 33 is secured to the cup-shaped member 28 and rotates in unison therewith, the agitator being preferably secured to the cup-shaped member by mounting the same upon the pin 31 between the nut 32 and the cup-shaped member. The hollow gear 25 is provided with a depending base or sleeve 25<sup>a</sup> adapted to enter the spout and connect the hopper thereto. The bevel gear 25 may be actuated in any suitable manner, but, in the present instance, I have provided a pinion 34 operatively connected to a shaft 35 which is journaled in suitable bearings 36 and 37, mounted on the base 8 and the main frame 1, respectively. The shaft 35 is provided on its outer end with a sprocket wheel 38. A sprocket wheel 39 is rigidly connected to one of the ground wheels 3. In the present instance this sprocket wheel comprises merely a ring provided with sprocket teeth and is secured to the spokes of the ground wheel by means of clips 40. A sprocket chain 41 extends about the sprocket wheels 39 and 38 and rotates the shaft 35 when the cultivator is in motion. In order to place the action of the feed mechanism under the control of the driver I have mounted on the shaft 35 a clutch member 42 adapted to coöperate with the corresponding clutch member 43 carried by the pinion 34. To this end the pinion 34 is rotatively mounted on the end of the shaft 35 and the clutch member 42 slidably mounted on the shaft and held against rotation relatively thereto, thereby enabling the same to be moved into and out of engagement with the clutch member 43 of the pinion. An actuating lever 44 is pivotally supported on the main frame 1 and is operatively connected to the clutch member 42.

The operation of the device will be readily understood from the foregoing description and it will be apparent that, as the cultivator or other implement moves along the row of corn, the discharge mouth of the spout 11 will be supported in close proximity to the ground and close to the row of plants under cultivation; and that the distribution of the fertilizer may be controlled by the operator through the medium of the closure for the discharge mouth of the spout in such a manner as to distribute the fertilizer either continuously along the row of plants or at the desired intervals. Further, it will be apparent that the mechanism here shown may be readily adapted for use, not only on cultivators, but on agricultural implements of various characters. It will also be apparent that I have provided positively driven feed mechanism, by means of which the fertilizer is continuously fed into the discharge spout, thereby rendering the operation of the distributer continuous. It will also be apparent that the device is in the form of an attachment and can be attached to existing cultivators without any modification in the construction thereof.

I wish it to be understood that I do not desire to be limited to the details of construction shown and described, for obvious modifications will occur to a person skilled in the art.

Having thus fully described my invention, what I claim as new and desire to secure by Letters Patent, is:—

1. The combination, with a cultivator, of a fertilizer distributer supported on said cultivator and comprising a hopper, and a spout supported beneath said hopper and adapted to receive the material therefrom, said spout having its lower end turned at an angle to the body portion thereof and extending laterally and rearwardly therefrom.

2. The combination, with a cultivator, of a fertilizer distributer supported on said cultivator and comprising a hopper, and a spout supported beneath said hopper and adapted to receive the material therefrom, said spout having its lower end turned at an angle to the body portion thereof, a closure for the discharge mouth of said spout, and means for controlling said closure.

3. The combination, with a cultivator, of a fertilizer distributer supported on said cultivator and comprising a hopper, a discharge mouth therefor, and feed mechanism mounted within said hopper, a bevel gear supported beneath said hopper and operatively connected to said feed mechanism, said bevel gear having an opening therein, a sleeve carried by said bevel gear and communicating with said opening, a spout supported beneath said sleeve, a shaft supported by said cultivator, a pinion carried by said shaft and adapted to mesh with said gear, and means for actuating said shaft from one of the ground wheels of said cultivator.

4. A fertilizer attachment for agricultural implements comprising a hopper, means for securing said hopper to an implement, a discharge spout supported beneath said hopper, adapted to receive the material therefrom and having its discharge mouth arranged in proximity to the ground, a closure for said discharge mouth pivotally supported on said spout, a spring adapted to retain said closure normally in its closed position, a horizontal shaft rotatably supported near said discharge spout, means for operatively connecting said shaft to said closure, and means under the control of the operator for actuating said shaft to open said closure.

In testimony whereof I affix my signature, in presence of two witnesses.

LOREN E. HEIFNER.

Witnesses:
WILLIAM D. MUMMERT,
CLOYD M. HEIFNER.